United States Patent
Zhang et al.

(10) Patent No.: US 11,337,255 B2
(45) Date of Patent: May 17, 2022

(54) WIRELESS COMMUNICATION METHOD AND DEVICE

(71) Applicants: Sharp Kabushiki Kaisha, Sakai (JP); FG Innovation Company Limited, New Territories (HK)

(72) Inventors: Chongming Zhang, Shanghai (CN); Shohei Yamada, Sakai (JP); Renmao Liu, Shanghai (CN)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 29 days.

(21) Appl. No.: 16/954,619

(22) PCT Filed: Dec. 24, 2018

(86) PCT No.: PCT/CN2018/123173
§ 371 (c)(1),
(2) Date: Jun. 17, 2020

(87) PCT Pub. No.: WO2019/120311
PCT Pub. Date: Jun. 27, 2019

(65) Prior Publication Data
US 2020/0314919 A1  Oct. 1, 2020

(30) Foreign Application Priority Data
Dec. 22, 2017 (CN) .......................... 201711414661.9

(51) Int. Cl.
*H04W 74/08* (2009.01)
*H04B 7/06* (2006.01)
(Continued)

(52) U.S. Cl.
CPC ...... *H04W 74/0833* (2013.01); *H04B 7/0695* (2013.01); *H04W 72/046* (2013.01); *H04W 74/006* (2013.01)

(58) Field of Classification Search
CPC ........... H04W 74/0833; H04W 72/046; H04W 74/006; H04W 72/04; H04W 72/10;
(Continued)

(56) References Cited

U.S. PATENT DOCUMENTS

2018/0317264 A1* 11/2018 Agiwal ................. H04W 52/50
2019/0387541 A1* 12/2019 Agiwal ............... H04W 74/085
2020/0275477 A1* 8/2020 Shah .................... H04W 74/004

FOREIGN PATENT DOCUMENTS

CN      101547520 A      9/2009

OTHER PUBLICATIONS

Official Communication issued in International Patent Application No. PCT/CN2018/123173, dated Mar. 6, 2019.
(Continued)

*Primary Examiner* — Thai Nguyen
(74) *Attorney, Agent, or Firm* — Keating & Bennett, LLP

(57) ABSTRACT

The present disclosure provides a method executed by user equipment, the method comprising: executing a random access procedure; and if a random access response message includes a backoff indicator, setting a preamble backoff time parameter to a time value corresponding to the backoff indicator multiplied by a configured parameter. Furthermore, the present disclosure further provides corresponding user equipment.

4 Claims, 2 Drawing Sheets

(51) Int. Cl.
*H04W 72/04* (2009.01)
*H04W 74/00* (2009.01)

(58) Field of Classification Search
CPC . H04W 74/00; H04W 72/042; H04W 74/004; H04W 74/0841; H04W 76/18; H04B 7/0695
See application file for complete search history.

(56) References Cited

OTHER PUBLICATIONS

NTT DOCOMO, "New SID Proposal: Study on New Radio Access Technology", 3GPP TSG RAN Meeting #71, RP-160671, Mar. 7-10, 2016, 8 pages.

Xiaomi, "Categorized Events for Differentiation of backoff and power ramping parameter", 3GPP TSG-RAN2 #100, R2-1712381, Nov. 27-Dec. 1, 2017, pp. 1-6.

* cited by examiner

WIRELESS COMMUNICATION METHOD AND DEVICE

TECHNICAL FIELD

The present disclosure relates to the field of wireless communications technologies, and in particular, to a method executed by user equipment and corresponding user equipment.

BACKGROUND

With the rapid growth of mobile communication and great progress of technology, the world will move toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject needing further and intensive study.

For this purpose, at the 3rd Generation Partnership Project (3GPP) RAN #64 plenary meeting held in March 2016, a study subject on new 5G radio access technology was proposed (see non-patent literature: RP-160671 New SID Proposal: Study on New Radio Access Technology). In the description of the work project, the working frequency band of the new communication system in the future may be expanded to 100 GHz, and can at least meet needs for enhanced mobile broadband service, communication of massive Internet of Things UEs, high-reliability service, and the like. The research of the project was completed in 2018.

In the research of this subject, it has been planned to perform information transmission by means of beams/beam forming, which specifically includes, during communication using high frequencies, transmitting narrow beams to cope with the characteristics of excessively quick fading of high frequency channels. However, information transmission using narrower beams is susceptible to external changes, such as mobile phone rotation or being blocked by other objects.

In transmission scenarios using beam forming, once a valid beam signal serving data/information transmission of UE weakens or its value is less than a pre-configured threshold, the data/information transmission is interrupted. The UE will transmit relevant request information to the network, requesting to reconfigure a valid working beam. In order to avoid the connection re-establishment caused by the long-term service interruption, a problem to be solved is how to speed up the completion of this requested reconfiguration procedure.

SUMMARY

The present disclosure provides a method executed by user equipment and corresponding user equipment, so as to solve at least some of the above problems.

According to one aspect of the present disclosure, the present disclosure provides a method executed by user equipment, the method comprising: transmitting a random access request message; receiving a random access response message; and when the random access response message includes uplink resource allocation information of the user equipment and when the random access is initiated by a request for recovering a radio link having a beam forming failure occurrence, transmitting, on an allocated uplink resource, a message including indication information. The indication information indicates that the random access request message is transmitted due to the request for recovering the radio link having the beam forming failure occurrence.

In one embodiment, the indication information includes a cell radio network temporary identifier (C-RNTI) media access control control element (MAC CE).

In one embodiment, the indication information includes a MAC CE indicating that the random access request message is transmitted due to the request for recovering the radio link having the beam forming failure occurrence.

In one embodiment, a processing priority of the MAC CE is higher than that of a MAC CE carrying BSR information, and higher than that of a MAC CE carrying PHR information.

In one embodiment, after the random access response message is received, when the random access response carries backoff time information, a preamble backoff time parameter of the user equipment is set to a product of a backoff time value in the random access response message multiplied by a specific coefficient.

In one embodiment, if the random access response message including the uplink resource allocation information of the user equipment is not received in a specific time window, the preamble backoff time of the user equipment is set to a product of the backoff time parameter multiplied by a specific coefficient.

In one embodiment, the specific parameter is pre-configured or randomly selected by the user equipment.

In one embodiment, the specific coefficient is equal to 0.

In one embodiment, the specific coefficient is greater than 0 and less than 1.

According to another aspect of the present disclosure, the present disclosure provides user equipment, comprising a processor and a memory. The memory has instructions stored thereon. The instructions, when run by the processor, cause the user equipment to execute the method described above.

BRIEF DESCRIPTION OF THE DRAWINGS

The above and other features of the present disclosure will become more apparent with the following detailed description in conjunction with the accompanying drawings.

It should be noted that the accompanying drawings are not necessarily drawn according to scale and focus on illustrating the principles of the technical solutions disclosed herein. Additionally, for clarity, like reference numerals refer to similar elements throughout the accompanying drawings.

DETAILED DESCRIPTION

Figure 1:
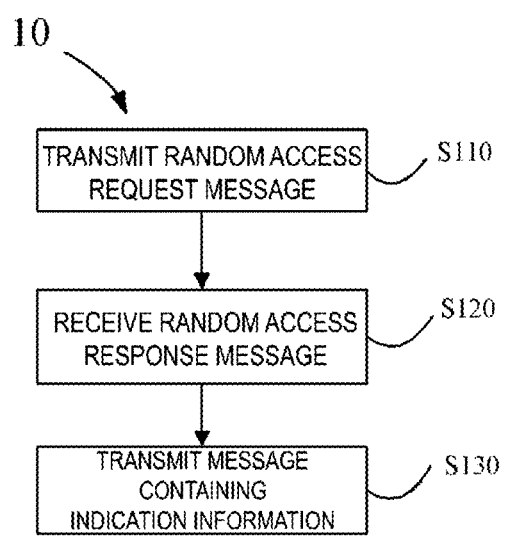
FIG. 1 is a flowchart of a method executed by user equipment according to an embodiment of the present disclosure.

The present disclosure is described below in detail with reference to the accompanying drawings and specific embodiments. It should be noted that the present disclosure should not be limited to the specific embodiments described below. In addition, for simplicity, detailed description of the known art not directly related to the present disclosure is omitted to avoid obscuring the understanding of the present disclosure.

In the following description, an NR mobile communications system and its later evolved versions are used as exemplary application environments; a base station and UE that support NR are used as examples to describe a plurality of embodiments of the present disclosure in detail. However, it should be pointed out that the present disclosure is not limited to the following embodiments but is applicable to a variety of other radio communications systems, such as an eLTE communications system, and is applicable to other base stations and UE, such as base stations and UE supporting eLTE. At the same time, the present disclosure is not limited to scenarios of radio link interruption caused by beams/beam forming, and may also be applied to scenarios of radio link interruption due to other reasons.

Prior to the specific description, several terms mentioned in the present disclosure are described as follows. The terms involved in the present disclosure shall have the meanings set forth below, unless otherwise indicated:

UE: User Equipment
RLF: Radio Link Failure
NR: New Radio
LTE: Long Term Evolution
eLTE: Enhanced Long Term Evolution
RRC: Radio Resource Control
PDCP: Packet Data Convergence Protocol (layer)
RLC: Radio Link Control (layer)
MAC: Medium Access Control (layer)
PHY: Physical Layer
MAC CE: Medium Access Control Control Element
PUCCH: Physical Uplink Control Channel
PDCCH: Physical Downlink Control Channel
PDCCH: Physical Downlink Control Channel
DCI: Downlink Control Information
TTI: Transmission Time Interval
NDI: New Data Indication
HARQ: Hybrid Automatic Repeat Request
HARQ Process ID: HARQ Process ID
BSR: Buffer Status Report
PHR: Power Headroom Report
SPS: Semi-Persistent Scheduling
PDU: Protocol Data Unit When detecting that a radio link performing beam forming fails during operation, UE may initiate a request for reconfiguring the radio link or reconfiguring a beam from a network side, or may transmit a beam failure recovery request. Two request modes exist. One is a contention free (CF)-based random access (RA) mode, and the other is a contention resolution (CB)-based random access mode.

In the CFRA working mode, the UE is configured with a dedicated preamble before the link failure. The preamble corresponds one-to-one with the identification of the UE. That is, once the network side receives the preamble, it can identify the UE, and in particular, can recognize a C-RNTI of the UE according to the preamble. Moreover, since this preamble is allocated to the UE, the preamble is only used for a request for recovering beams, or recovering a working link, or reconfiguring a link when a beam failure occurs. When receiving the preamble, the network side can scramble the PDCCH by using the C-RNTI of the UE, and transmit DCI on the PDCCH to perform downlink assignment or uplink scheduling for the UE. Once the DCI scrambled with the C-RNTI of the UE is correctly received, the UE may consider that reconfiguration is completed or that a beam failure recovery is successfully completed.

The CFRA may be completed with only two steps: the UE transmits the preamble, and then receives the DCI transmitted by the network side, such that the link may be quickly recovered. However, this mode has its limitations, that is, only when a valid candidate beam direction exists can the UE transmit the pre-allocated preamble corresponding one-to-one with the UE in the candidate beam direction. That is, only when a valid candidate link exists can the UE adopt such a contention free-based access mode. The so-called valid candidate link refers to a link where a level value or intensity measured thereon is greater than a specific threshold. These candidate links are pre-configured by the network to the UE.

Once no valid beam direction or candidate link exists, for the purpose of beam failure recovery, the UE may also rely on the contention resolution-based random access (CBRA) mode. The so-called "contention resolution-based access mode" is a common access mode. When the UE needs to initiate access, it randomly selects a preamble and transmits the preamble on a common PRACH resource. Since the preamble is randomly selected by the UE, other UE having an access requirement may also select the same preamble and simultaneously transmit the preamble. Therefore, the network side cannot uniquely identify the UE by means of only the received preamble, thus a further interaction is required to resolve the contention. After receiving the preamble, the network side transmits a random access response (RAR). The RAR carries a RAPID, so that the UE can determine, according to the RAPID, whether the RAR is the one expected to be transmitted to the UE. The RAPID refers to a Random Access Preamble ID. Each preamble has a corresponding RAPID. Therefore, after transmitting the preamble, the UE can determine whether the response is a response to the transmitted preamble according to the RAPID in the RAR.

In addition to the RAPID, the RAR also includes an uplink grant (UL grant) corresponding to the RAPID. Once the UE confirms that the RAPID corresponds to the preamble transmitted by the UE, the UE may transmit an uplink message on the UL grant corresponding to the RAPID. This message is generally referred to as message 3 (MSG3). The content of the MSG3 may vary depending on different reasons for the UE to initiate access. For example, the UE in a connection state may initiate a contention resolution-based random access when a scheduling request is triggered by arrival of data. In this case, the UE carries the C-RNTI in the MSG3. After receiving the MSG3, the network side may schedule the UE in the following message 4 (MSG4). As another example, when receiving a PDCCH order transmitted by the network side, the UE in a connection state may also initiate a contention resolution-based random access. In this case, the UE carries the C-RNTI in the MSG3. After receiving such the MSG3, the network side may transmit a new timing advance to the UE in the MSG4.

Similarly, for UE requiring link recovery or transmitting a beam failure recovery request, a C-RNTI of the UE may be carried in the MSG3, such that the network can schedule the UE in the following MSG4.

However, at present, the network side cannot identify, only according to the C-RNTI carried in the MSG3, the reason for the UE to initiate the contention resolution-based random access procedure. If the network side can identify the UE that initiates the contention resolution-based random access to recover a link, then the network side can prioritize the UE or schedule the UE in a limited way, so as to avoid an excessively long link interruption time, which results in RRC connection re-establishment of the UE and, further, wasting of extra resources on the re-establishment of an RRC connection.

FIG. 1 is a flowchart of a method executed by user equipment according to one embodiment of the present disclosure.

In step S110, UE transmits a random access request message.

In step S120, UE receives a random access response message.

In step S130, when the random access response message received in step S120 includes uplink resource allocation information of the UE and when random access initiated by the UE is initiated by a request for recovering a radio link having a beam forming failure occurrence, the UE transmits, on an allocated uplink resource, a message including indication information. The indication information indicates that the random access request message is transmitted due to the request for recovering the radio link having the beam forming failure occurrence.

In one embodiment, the indication information may include a C-RNTI MAC CE.

Alternatively, the indication information may include a MAC CE indicating that the random access request message is transmitted due to the request for recovering the radio link having the beam forming failure occurrence. In this case, preferably, a processing priority of the MAC CE is higher than that of a MAC CE carrying BSR information and that of a MAC CE carrying PHR information.

In one embodiment, after the random access response message is received, when the random access response carries backoff time information, a preamble backoff time parameter of the UE may be set to a product of a backoff time value in the random access response message multiplied by a specific coefficient. Alternatively, if the random access response message including the uplink resource allocation information of the UE is not received in a specific time window, the preamble backoff time of the UE may be set to a product of the backoff time parameter multiplied by a specific coefficient.

The specific parameter may be pre-configured or randomly selected by the UE. For example, the specific coefficient may be greater than 0 and less than 1. Additionally, the specific coefficient may be equal to 0.

The message including the indication information transmitted by the UE in step S130 is described below in detail through several specific examples.

EXAMPLE 1

Indication Information is Achieved By C-RNTI MAC CE

An existing C-RNTI MAC CE includes two bytes for carrying a C-RNTI (16 bits) and is identified by a corresponding LCID value in an LCID field of a MAC PDU subheader. For example, when LCID=111010 appears in the MAC PDU subheader, it is indicated that the corresponding MAC CE is a C-RNTI MAC CE.

The new C-RNTI MAC CE proposed in the present disclosure may include two LCID values respectively used in different scenarios:

when the random access procedure is triggered or initiated by a situation or a condition related to link reconfiguration or beam failure, then the LCID identifying the C-RNT MAC CE adopts LCID1 or a value of LCID1; and when the random access procedure is not triggered for the above reasons, then the LCID identifying the C-RNT MAC CE adopts LCID2 or a value of LCID2.

"The random access procedure is triggered or initiated by a situation or a condition related to link reconfiguration or beam failure" described above and below may specifically be one or a plurality of the following situations:

Situation 1: the random access procedure is triggered or initiated by an indication from a lower layer, and further, the indication from the lower layer may be a beam failure or link failure, a link reconfiguration request, or a beam failure recovery request;

Situation 2: the random access procedure is triggered or initiated by a beam failure recovery request or a link reconfiguration request; and Situation 3: the C-RNTI MAC CE is used to indicate a beam failure recovery request or a link reconfiguration request.

"The random access procedure is not triggered or initiated for the above reasons" described above and below may be specifically one or a plurality of the following situations:

Situation 1: the random access procedure is not triggered by an indication from a lower layer, and further, the indication from the lower layer may be a beam failure or link failure, a link reconfiguration request, or a beam failure recovery request;

Situation 2: the random access procedure is not triggered by a beam failure recovery request or a link reconfiguration request;

Situation 3: the C-RNTI MAC CE is not used to indicate a beam failure recovery request or a link reconfiguration request; and Situation 4: the C-RNTI MAC CE is used for a general random access procedure, for example, a random access procedure initiated by an RRC layer, or a random access procedure initiated by a PDCCH command.

For example, the above C-RNTI MAC CE may be used in the following procedures:

When the UE successfully receives the random access response (RAR) for the first time in the current random access procedure, the UE indicates a MAC entity or a portion in the MAC entity responsible for multiplexing and assembly functions, or indicates a multiplexing and assembly entity to include the C-RNTI MAC CE in the subsequent uplink transmission. Here, the subsequent uplink transmission may refer to transmission of the MSG3.

Then, the UE obtains a MAC PDU from the multiplexing and assembly entity or the MAC entity, and stores the MAC PDU in a buffer of the MSG3. This MAC PDU is the content carried by the MSG3. It can be seen that this MAC PDU is a MAC PDU including the C-RNTI MAC CE.

When the C-RNTI MAC CE is included in the MAC PDU, if the current random access procedure is triggered by a situation or a condition related to link reconfiguration or beam failure, then LCID1 is used to identify the C-RNTI MAC CE. In particular, the C-RNTI MAC CE may be identified in the MAC PDU subheader; if the current random access procedure is not triggered by the situations described above, then LCID2 is used to identify the C-RNTI MAC CE. In particular, the C-RNTI MAC CE may be identified in the MAC PDU subheader.

EXAMPLE 2

Indication Information is Achieved By MAC CE

In this example, the MAC CE is used as the indication information. This MAC CE may indicate one or a plurality of the following situations:

Situation 1: the random access is triggered by an indication from a lower layer, and further, the indication from the lower layer may be a beam failure or link failure, a link reconfiguration request, or a beam failure recovery request;

Situation 2: the random access procedure is triggered by a beam failure recovery request or a link reconfiguration request;

Situation 3: the C-RNTI MAC CE is used to indicate a beam failure recovery request or a link reconfiguration request; and Situation 4: a beam failure recovery request or a link reconfiguration request is indicated.

A specific design of this MAC CE may be a MAC CE identified by a specific LCID value in a MAC PDU subheader, and have a fixed length of zero or non-zero. If the length is not zero, the MAC CE can further carry some information related to a link or beam. The MAC CE may be referred to as a MAC CE for failure recovery. The MAC CE for failure recovery may be used in the following procedures:

When the UE successfully receives the RAR for the first time in the current random access procedure, the UE indicates a MAC entity or a part in the MAC entity responsible for multiplexing and assembly functions, or a multiplexing and assembly entity to include the C-RNTI MAC CE in the subsequent uplink transmission. In addition, if the random access procedure is triggered by a situation or a condition related to link reconfiguration or beam failure, then the MAC CE for failure recovery further needs to be included in the subsequent uplink transmission. Here, the subsequent uplink transmission may refer to transmission of the MSG3.

Then, the UE obtains a MAC PDU from the MAC entity and the portion in the MAC entity responsible for the multiplexing and assembly functions, or from the multiplexing and assembly entity, and stores the MAC PDU in a buffer of the MSG3. This MAC PDU is the content carried by the MSG3.

It can be seen that, if the random access procedure is triggered by a situation or a condition related to link reconfiguration or beam failure, then the MAC PDU obtained by the UE from the multiplexing and assembly entity includes the C-RNTI MAC CE and the MAC CE for failure recovery. In other words, the MSG3 includes the C-RNTI MAC CE and the MAC CE for failure recovery. Otherwise, the MAC PDU obtained by the UE from the multiplexing and assembly entity includes only the C-RNTI MAC CE, and does not include the MAC CE for failure recovery.

EXAMPLE 3

Indication Information Also Indicates Priority

In this example, the MAC entity also configures a processing priority of the MAC CE for failure recovery when multiplexing and assembling the MAC PDU. In particular, the processing priority refers to a multiplexing and assembly processing priority.

A MAC PDU may include one or a plurality of MAC CEs and data from each logic channel. The size of the MAC PDU is determined (by the UL grant received by the UE). In the finite MAC PDU, if the UE has a plurality of MAC CEs to be transmitted, then priorities of these MAC CEs need to be formulated so as to determine which MAC CE or MAC CEs having priority to be included in the space in the MAC PDU and subsequently when space remains, then determining which MAC CE or MAC CEs to be included. In other words, the UE determines a sequence of the MAC CEs in MAC PDU space allocation according to the specified processing priorities.

In an existing mechanism, when the UE has a MAC CE for C-RNTI (a MAC CE carrying the C-RNTI), a MAC CE for SPS confirmation (a MAC CE carrying the semi-persistent scheduling confirmation), a MAC CE for BSR (a MAC CE carrying the buffer status report), and a MAC CE for PHR (a MAC CE carrying the power headroom), during generation of a MAC PDU, the UE gives prior consideration to the MAC CE for C-RNTI. Then, if remaining space exists, the MAC CE for SPS confirmation is added, and subsequently consideration is given to the MAC CE for BSR, and finally the MAC CE for PHR. It can be seen that the processing priorities of these MAC CEs are as follows: the processing priority of the MAC CE for C-RNTI is higher than that of the MAC CE for SPS confirmation; the processing priority of the MAC CE for SPS confirmation is higher than that of the MAC CE for BSR; and the processing priority of the MAC CE for BSR is higher than that of the MAC CE for PHR. The processing sequence is as follows:

MAC CE for C-RNTI;
MAC CE for SPS confirmation;
MAC CE for BSR; and
MAC CE for PHR.

A new MAC CE is illustrated in example 2, which may be used to indicate information related to the beam failure or link reconfiguration (see example 2 for details) and may be referred to as a MAC CE for failure recovery. When this MAC CE is generated, in order to ensure that both this MAC CE and the MAC CE for C-RNTI may be included in the same MAC PDU, a processing priority sequence should be considered as follows:

a processing priority of the MAC CE for failure recovery is higher than that of any one of the MAC CE for SPS confirmation, the MAC CE for BSR, and the MAC CE for PHR. A possible order is as follows:

MAC CE for failure recovery;
MAC CE for SPS confirmation;
MAC CE for BSR; and
MAC CE for PHR.

In addition, it may be considered that the priority of the MAC CE for failure recovery is the same as that of the MAC CE for C-RNTI, or the priority of the MAC CE for C-RNTI is higher than that of the MAC CE for failure recovery. If a buffer of the UE includes data from a non-uplink common control channel, the priority of the MAC CE for failure recovery may be higher than that of the data. A possible order is as follows:

MAC CE for C-RNTI;
MAC CE for failure recovery;
MAC CE for SPS confirmation;
MAC CE for BSR;
MAC CE for PHR; and
data from a non-uplink common control channel.

The previous examples 1-3 focus on enabling the network side to identify the UE performing the random access triggered by the beam failure in MSG3. In an existing contention resolution-based random access procedure, a set of backoff mechanisms exist for avoiding congestion during preamble transmission. A working mode of the mechanism is as the following: an index indicated by a backoff indicator BI field in the RAR corresponds to a time value, which is usually in the unit of milliseconds.

After the UE receives the RAR, if the BI field is included in the RAR, the UE sets PREAMBLE_BACKOFF to the time value corresponding to the index indicated by the BI field; and if the BI field is not carried in the RAR, then the UE sets the backoff time parameter PREAMBLE_BACKOFF to 0 milliseconds.

If the UE does not receive the PDCCH scrambled by the C-RNTI in a specific time window, or does not receive the RAR carrying the RAPID corresponding to the preamble transmitted by the UE, then the UE randomly selects a value from 0 to PREAMBLE_BACKOFF as the length of the backoff time. Then, the UE delays subsequent transmitting of the preamble for a period of time, where the delay time length is the previously selected backoff time length.

Given the timeliness of the beam failure recovery, if the transmission delay time is excessively long, that is, a transmission interruption of the UE is excessively long, a radio link connection failure easily occurs. In the following examples 4 and 5, sending delay is optimized.

EXAMPLE 4

In this example, after the UE receives the RAR including the BI field:

if the random access procedure is not triggered by a situation or a condition related to link reconfiguration or beam failure, the UE sets the backoff time parameter PREAMBLE_BACKOFF to the time value corresponding to the index indicated by the BI field; and if the random access procedure is triggered by a situation or a condition related to link reconfiguration or beam failure, the UE sets the backoff time parameter PREAMBLE_BACKOFF to zero.

Another implementation may be as follows:

after the UE receives the RAR including the BI field:

if the random access procedure is not triggered by a situation or a condition related to link reconfiguration or beam failure, the UE sets the backoff time parameter PREAMBLE_BACKOFF to the time value corresponding to the index indicated by the BI field; and if the random access procedure is triggered by a situation or a condition related to link reconfiguration or beam failure, the UE sets the PREAMBLE_BACKOFF to the time value corresponding to the index indicated by the BI field multiplied by a parameter (or coefficient).

The parameter (or coefficient) may be pre-configured by the network, for example, broadcasted in system information, and used for calculation of PREAMBLE_BACKOFF of the UE in the situation where the random access procedure is triggered by a situation or a condition related to link reconfiguration or beam failure; or the parameter (or coefficient) is randomly selected by the UE. Preferably, the parameter is a number selected from 0 to 1, so that the final value of PREAMBLE_BACKOFF does not exceed the time value corresponding to the index indicated by the BI field.

EXAMPLE 5

In this example, when the UE does not receive the PDCCH scrambled by the C-RNTI in a specific time window or does not receive the RAR carrying the RAPID corresponding to the preamble transmitted by the UE, or when the contention resolution timer expires, if the random access procedure is not triggered by a situation or a condition related to link reconfiguration or beam failure, then the UE randomly selects a value from 0 to the backoff time parameter PREAMBLE_BACKOFF as the time length of the backoff time, and delays subsequent transmitting of the preamble for a period of time before transmitting again, where the length of the delay time is the previously selected length of the backoff time; and if the random access procedure is triggered by a situation or a condition related to link reconfiguration or beam failure, then the UE does not need to delay the transmitting of the preamble, that is, the UE can directly perform resource selection of the random access procedure.

Another implementation may be as follows:

when the UE does not receive the PDCCH scrambled by the C-RNTI in a specific time window, or does not receive the RAR carrying the RAPID corresponding to the preamble transmitted by the UE:

if the random access procedure is not triggered by a situation or a condition related to link reconfiguration or beam failure, the UE randomly selects a value from 0 to the backoff time parameter PREAMBLE_BACKOFF as the length of the backoff time, and delays subsequent transmitting of the preamble for a period of time before transmitting again, where the length of the delay time is the previously selected length of the backoff time; and if the random access procedure is triggered by a situation or a condition related to link reconfiguration or beam failure, the UE randomly selects a value from 0 to the backoff time parameter PREAMBLE_BACKOFF, uses the value multiplied by a parameter (or coefficient) as the length of the backoff time, and delays subsequent transmitting of the preamble for a period of time before transmitting again, where the length of the delay time is the previously selected length of the backoff time.

The parameter (or coefficient) may be pre-configured by the network, for example, broadcasted in system information, and used for calculation of the backoff time of the UE in the situation where the random access procedure is triggered by a situation or a condition related to link reconfiguration or beam failure; or the parameter (or coefficient) is randomly selected by the UE. Preferably, the parameter (or coefficient) is a number from 0 to 1, so that the final backoff time is less than or equal to a selected value.

Figure 2:
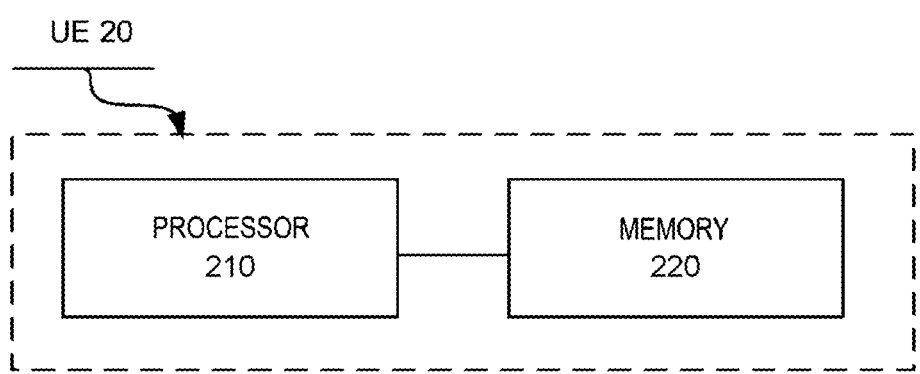
FIG. 2 is a block diagram of user equipment according to an embodiment of the present disclosure.

FIG. 2 is a block diagram of user equipment 20 according to an embodiment of the present disclosure. As shown in FIG. 2, the user equipment 20 includes a processor 210 and a memory 220. The processor 210 may, for example, include a microprocessor, a microcontroller, an embedded processor, or the like. The memory 220 may, for example, include a volatile memory (for example, a random access memory (RAM)), a hard disk drive (HDD), a non-volatile memory (for example, a flash memory), or other memories and the like. Program instructions are stored on the memory 220. The instructions, when run by the processor 210, can perform the aforementioned method performed by user equipment (for example, the method shown in FIG. 1) described in detail in the present disclosure.

The program running on the device according to the present disclosure may be a program that controls a central processing unit (CPU) so as to enable a computer to implement the functions of the embodiments of the present disclosure. The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions may be implemented by the computer system through reading programs recorded on the recording medium and executing them. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other computer-readable recording medium.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be an existing processor, a controller, a microcontroller, or a state machine. The circuit may be a digital circuit or an analog circuit. When new integrated circuit technologies replace existing integrated circuits because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as UE or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications may be made to the present disclosure within the scope of the claims. Embodiments resulting from the appropriate combinations of the technical means disclosed in different embodiments are also included within the technical scope of the present disclosure. In addition, components with the same effect described in the embodiments above may be replaced with one another.

The invention claimed is:

1. A method performed by a user equipment (UE) comprising:
receiving a configured parameter for a beam failure recovery from a base station;
performing a random access procedure; and
in a case that a Random Access Response includes a Backoff Indicator (BI), setting PREAMBLE_BACKOFF to a value of timing corresponding to the BI multiplied with the configured parameter.

2. The method according to claim 1, wherein
the configured parameter is set to a value between 0 and 1.

3. A user equipment (UE) comprising:
processing circuitry configured or programmed to:
receive a configured parameter for a beam failure recovery from a base station;
perform a random access procedure; and
in a case that a Random Access Response includes a Backoff Indicator (BI), set PREAMBLE_BACKOFF to a value of timing corresponding to the BI multiplied with the configured parameter.

4. The UE according to claim 3, wherein
the configured parameter is set to a value between 0 and 1.

* * * * *